Figure 1:
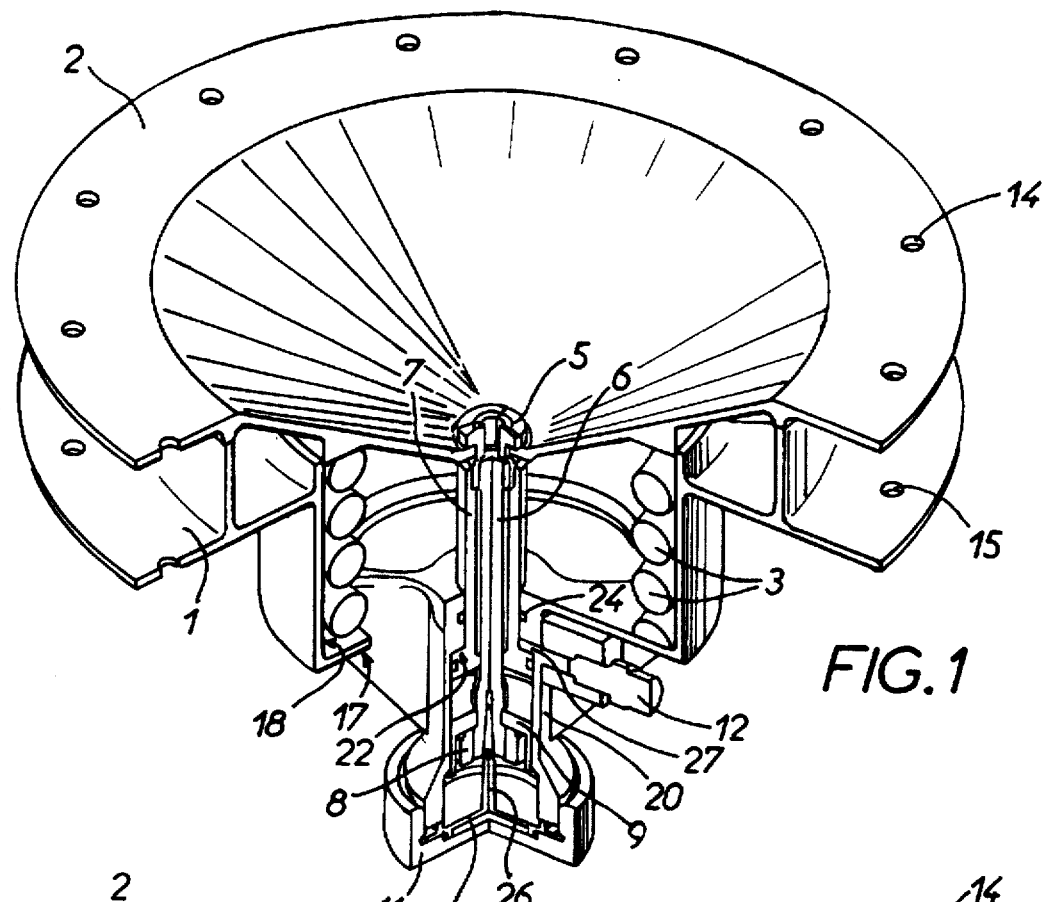

United States Patent [19]

Aubret et al.

[11] Patent Number: 5,755,407
[45] Date of Patent: May 26, 1998

[54] SLOTTED NUT TYPE RELEASING DEVICE FOR MICROSATELLITE EJECTOR

[75] Inventors: Jean-Pierre Aubret; Michel Barriere, both of Saint Medard en Jalles, France

[73] Assignee: Aerospattale Societe Nationale Industrielle, Paris, France

[21] Appl. No.: 677,316

[22] Filed: Jul. 2, 1996

[30] Foreign Application Priority Data

Jul. 13, 1995 [FR] France ................................ 95 08503

[51] Int. Cl.⁶ ........................................................ B64G 1/64
[52] U.S. Cl. ........................ 244/161; 644/137.4; 644/158 R
[58] Field of Search ............................... 244/158 R, 161, 244/137.1, 137.4

[56] References Cited

U.S. PATENT DOCUMENTS

| | | | |
|---|---|---|---|
| 3,174,706 | 3/1965 | Wagner | 244/158 R |
| 3,547,375 | 12/1970 | Mackey | 244/158 R |
| 4,067,308 | 1/1978 | Anderson et al. | 244/158 R |
| 4,625,619 | 12/1986 | Ceniza | 244/158 R |
| 4,632,339 | 12/1986 | Yuan | 244/158 R |
| 5,395,149 | 3/1995 | Herman et al. | 244/158 R |

FOREIGN PATENT DOCUMENTS

| | | |
|---|---|---|
| 0 296 936 | 12/1988 | European Pat. Off. . |
| 0 363 242 | 4/1990 | European Pat. Off. . |
| 0657352 | 6/1995 | European Pat. Off. . |
| 2 661 466 | 10/1991 | France . |

Primary Examiner—William Grant
Attorney, Agent, or Firm—Nikaido, Marmelstein, Murray & Oram LLP

[57] ABSTRACT

The locking member of the ejector body (1) is a tensioning pin (6) extending inside a shaft (20) provided below the ejector body. The tensioning pin bears a ring (9) forming an abutment against which the releasing piston (7) comes to bear when the pyrotechnical igniter (12, 13) is triggered. The impact of the pin is attenuated at the end of its travel through the shaft by a shock absorber (10) held on the base of the shaft.

7 Claims, 2 Drawing Sheets

SLOTTED NUT TYPE RELEASING DEVICE FOR MICROSATELLITE EJECTOR

The invention concerns the technical field of systems for placing satellites in orbit from a platform located on the final stage of a launch rocket or vehicle, and it relates more particularly to a slotted nut type releasing device associated with a spring type ejector device.

There are many devices for placing satellites in orbit from a rocket and the purpose of which is thus to release the satellite from its support and to separate it swiftly therefrom by ejection.

To release large satellites, it is known to use assemblies comprising several spring type ejectors and releasing devices associated with retaining belts. For less heavy satellites, several releasing and ejecting systems exist. There is known, for instance, from document FR-A 2 616 856, a mechanism for controlling the swift separation of two parts comprising a thrust member capable of moving in a first one of the parts towards the second part, from a rest position in which one end of the thrust member is in contact with the second part, a motor member capable of moving in a given stroke between a rest position and an actuation position inside the first part, through the effect of the motive force, and an elastic element interposed between the motor member and the thrust member, such that movement of the motor member from its rest position to its actuation position has the effect of applying the force of a given intensity to the second part, via the thrust member.

This mechanism performs the ejection function using an abundant supply of stored motive force, which can be pyrotechnical, pneumatic, hydraulic or mechanical, without the speed and acceleration of ejection being adversely affected by storage of the mechanism for an indeterminate period.

There is also known, from document FR-A 2 707 750, a device for ejecting objects using pyrotechnics and which makes it possible to act on the longitudinal velocity, hence to chose the most suitable trajectory during flight.

For this purpose, the pyrotechnical means include a plurality of separate pyrotechnical sources and different inclined finger-ramp couplings permitting choice, in flight, of the pyrotechnical source and the coupling best suited to the object to achieve the desired objective.

As more specifically regards the members known as releasing devices which ensure the separation of the two elements, there exist a certain number of these, the most common being of the slotted nut type. Thus, document EP-A 0 363 242, describes a device for temporarily joining two elements to one another and which comprises a male element connected to one of the elements and a female element connected to the other element, the female element comprising, in a hollow body elongated along one axis, a retaining sleeve adapted to contract radially onto the male element, or to expand, a piston sliding axially for maneuvering the retaining sleeve in contraction or expansion and, in the piston, disposed along the axis, an ejection finger which is connected thereto by a breakable member, selective control means being provided, either for simply controlling the piston in its movement or, in addition, for breaking the breakable member and causing the ejecting finger to slide axially so as to project in relation to the said piston.

There is also a form of embodiment in which the slotted nut is in the body of the releasing device and on a mobile unit permitting integration from the rear, as described in document FR-A 2 661 466.

These releasing devices, owing to the breaking of a breakable element, induce a shock which is applied to the satellite at the time of its ejection, which can be detrimental to the equipment on board. In addition, with the known ejectors and releasing devices, the preparatory operations that have to be carried out on site are lengthy, given the relative complexity and fragility of the constituent elements. A slotted nut type releasing device has been developed which overcomes these drawbacks and has numerous complementary advantages, particularly as regards the simplicity and robust nature of the whole, as well as adaptability to a varied range of satellite payloads.

The invention thus relates to a slotted nut type releasing device for a microsatellite ejector, in which a releasing piston in the form of a sleeve, via a slotted nut, retains a lock no member of a rocket platform ejector body on a satellite base, and in which a spring bearing against the platform ensures the ejection of the satellite after its release through the action of a pyrotechnical igniter, a releasing device wherein the locking member is a tensioning pin extending inside a shaft provided below the ejector body, wherein the tensioning pin bears an abutment against which the releasing piston comes to bear when the pyrotechnical igniter is triggered, and wherein the impact of the pin is attenuated at the end of its travel through the shaft by a shock absorber held on the base of the shaft. The tensioning pin is hollowed out at its base to form an axial notch analogous to the profile of a pin borne by the shock absorber.

Furthermore, the releasing piston has an edge that comes to bear against a shoulder of a central shaft forming part of the ejector body, and sealingly closes the shaft.

According to another particular feature of the invention, the abutment of the tensioning pin is formed by a ring capable of sliding through the shaft and traversed by a the pin, a tensioning nut being screwed onto the pin and bearing against the lower face of the ring.

Figure 2:
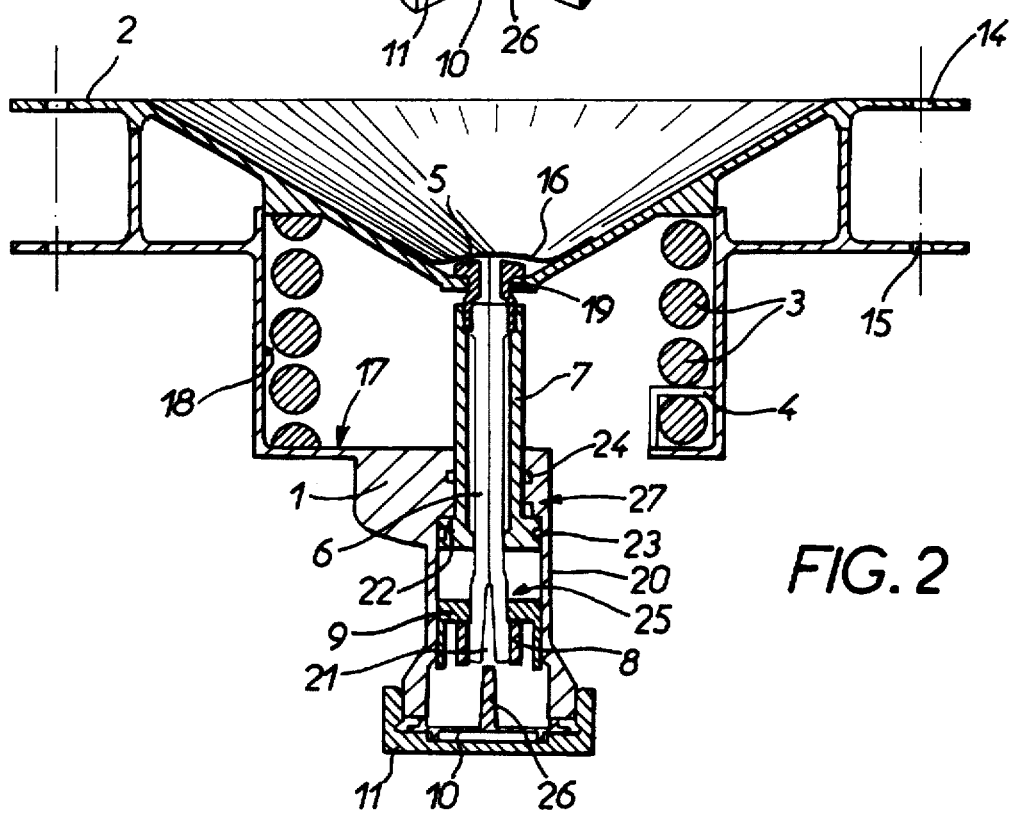
Figure 3:
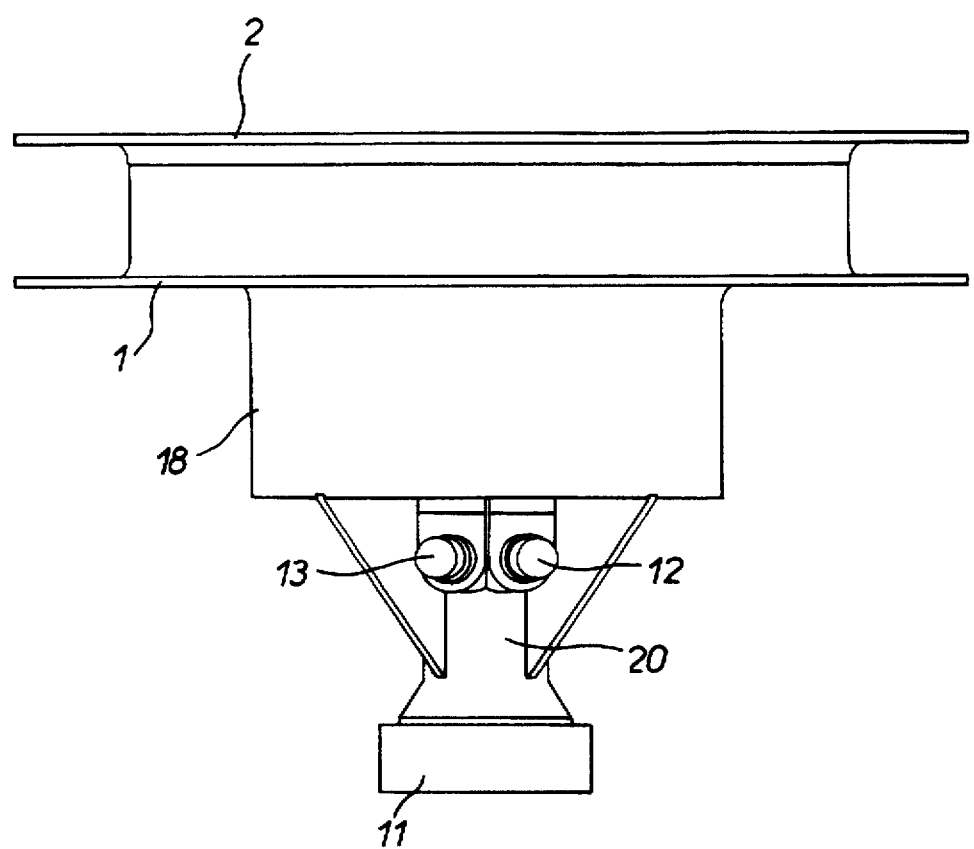

Further special features and advantages of the invention will emerge from the following description of a form of embodiment provided by way of example, reference being made to the annexed drawings, which show:

FIG. 1, a perspective view, certain parts being removed, of the releasing device;

FIG. 2, a diametrical, vertical cross-sectional view of the releasing device; and FIG. 3, the same view in elevation.

The assembly shown in FIGS. 1 and 2 comprises two main portions, namely an elector body 1, connected to the platform, not shown, of the rocket by connecting screws passing through holes 15, and a base 2 serving to support the microsatellite with the help of connecting screws passing through holes 14.

Ejector body 1 is provided with a central cylindrical bore 18 inside which is housed an ejection spring 3, held on the ejector body by clips 4. The spring is compressed between a circular shoulder 17 at the base of bore 18 and the lower face of base 2. The ejector body, below shoulder 17, forms a downwardly extending central shaft, which is open at its lower portion. A slotted nut 5 in three or four parts is placed in a recess 19 provided in the center of the base. Nut 5 is provided with a head which normally bears against the circular edge of the recess. This head is held in position against this edge by a retaining plate 16 fixed to the base, which plate may have the shape of a cupel or a washer.

The internally threaded base of slotted nut 5 is held in engagement on the threaded end of a tensioning pin 6 which occupies the center of bore 18 and extends inside shaft 20. Pin 6 is hollowed out at its base to form an upwardly tapering frustoconical axial notch 21. The upper end of a releasing piston 7, taking the form of a sleeve, encircles the portion of slotted nut 5 that is screwed onto the threaded end of pin 6. The lower end of piston 7 forms an edge which comes to bear against a shoulder 22 provided in shaft 20. The piston thus closes the shaft and tightness is ensured by a seal 23 housed in an annular groove formed on the outer peripheral edge of the piston, and by a seal 24 housed in an annular groove formed in the inner portion of the shaft.

A ring 9, capable of sliding inside shaft 20, is pierced by a central orifice 25 through which passes the lower end of pin 6. A tensioning nut 8, screwed onto this threaded lower end of the pin 6, bears on the lower face of ring 9.

The lower opening of central shaft 20 is closed by a cap 11, inside which is held a shock absorber 10. The shock absorber takes the form of a thin disk, the peripheral edge of which is blocked between the base of shaft 20 and cap 11 when the latter is screwed on. The disk, which is relatively flexible, has at its center an upwardly orientated pin 26 with a frustoconical profile, analogous to the profile of notch 21.

Two independent pyrotechnical igniters, 12 and 13, which are shown in FIG. 3, are located below bore 18 and communicate with a small chamber 27 in the area of shoulder 22, that is to say just above the base of releasing piston 7.

The figures show the mechanism prior to the triggering of the release.

As soon as the order to eject the satellite is transmitted, the two igniters, 12 and 13, are fired by two independent circuits; thus, the device can function even if one circuit or one igniter fails. The gases produced by the ignition then build up in the small chamber 27 and act on piston 7, pushing it downwards. This movement releases slotted nut 5, the threaded portions of which can separate from one another and release pin 6. During its downward movement, the piston will then drive down tensioning pin 6 as soon as it has come into abutment against ring 9, since the nut 8 supporting the ring is screwed onto the pin. At the end of the stroke of pin 6, its frustoconical notch 21 engages on frustoconical pin 26 of shock absorber 10, and the impact of pin 6 is thus attenuated before it is blocked and immobilized. The flexibility of the shock absorber disk also contributes to this shock absorbing operation.

As base 2 is no longer held on ejector body 1 by the releasing device, spring 3 experts a thrusting force on the base and the satellite is separated from the platform at the required velocity. Thanks to retaining plate 16, slotted nut 5 remains connected to the base and is not projected outwards.

We claim:

1. A releasing device for a satellite ejector which comprises a rocket platform ejector body having a hollow shaft extending therefrom, a satellite base resting on said body, a spring compressed between said body and said base, and a locking device holding said base and said body together;

said locking device comprising:

a tensioning pin extending inside said shaft, a slotted nut associated with said base and releasably engaging said pin, a releasing piston including a sleeve, said piston at a first position having said sleeve hold said slotted nut in place and at a second position releasing said slotted nut, means for causing said releasing piston to move from said first position to said second position, an abutment on said tensioning pin which is engaged by said piston at said second position causing said pin to travel away from said slotted nut, and a shock absorber at an end of said shaft attenuating an impact of said pin at an end of its travel through said shaft.

2. Releasing device according to claim 1, wherein said tensioning pin at an end adjacent said abutment has a hollowed axial notch, and said shock absorber has a pin extending toward said tensioning pin having a profile analogous to said notch.

3. Releasing device according to claim 1, wherein said releasing piston has an edge which at said first position bears against a shoulder of said shaft and sealingly closes said shaft.

4. Releasing device according to claim 1, wherein said abutment of said tensioning pin comprises a ring slidable in said shaft and being traversed by said tensioning pin, and a tensioning nut threadingly engaged with said tensioning pin and bearing against a face of said ring opposite to said piston.

5. Releasing device according to claim 1, further comprising a cap closing said end of said shaft and housing said shock absorber.

6. Releasing device according to claim 1, wherein said shock absorber comprises a thin flexible disk.

7. Releasing device according to claim 1, wherein said releasing piston has a base end, said body has a small chamber defined therein along said shaft adjacent said base end of said piston when said piston is at said first position, and said means for causing said releasing piston to move from said first position to said second position comprises at least one pyrotechnical device communicating with said small chamber.

* * * * *